United States Patent
Porte et al.

(10) Patent No.: US 11,313,251 B2
(45) Date of Patent: Apr. 26, 2022

(54) ANTERIOR PART OF A NACELLE OF AN AIRCRAFT PROPULSION SYSTEM HAVING A SHIELD IN FRONT OF ITS RIGIDIFYING FRAME

(71) Applicant: Airbus Operations (S.A.S.), Toulouse (FR)

(72) Inventors: Alain Porte, Toulouse (FR); Julien Sentier, Toulouse (FR); Clément Breton, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 35 days.

(21) Appl. No.: 16/985,413

(22) Filed: Aug. 5, 2020

(65) Prior Publication Data

US 2021/0040867 A1   Feb. 11, 2021

(30) Foreign Application Priority Data

Aug. 7, 2019 (FR) ...................................... 1909033

(51) Int. Cl.
*F01D 25/28* (2006.01)
*B64D 29/00* (2006.01)
(Continued)

(52) U.S. Cl.
CPC .............. *F01D 25/28* (2013.01); *B64D 29/00* (2013.01); *B64D 33/02* (2013.01); *F01D 25/24* (2013.01);
(Continued)

(58) Field of Classification Search
CPC ......... F01D 25/28; F01D 25/24; B64D 29/00; B64D 2033/02; B64D 2033/022; B64D 2033/0233; F02C 7/20
See application file for complete search history.

(56) References Cited

U.S. PATENT DOCUMENTS

| 9,284,060 B2 * | 3/2016 | Porte ...................... B64D 33/02 |
| 9,874,228 B2 * | 1/2018 | Brown .................... B64D 29/00 |

(Continued)

FOREIGN PATENT DOCUMENTS

| CN | 112340036 A | 2/2021 |
| EP | 3 103 723 A1 | 12/2016 |

(Continued)

OTHER PUBLICATIONS

French Search Report for Application No. 1909033 dated Feb. 7, 2020.

(Continued)

*Primary Examiner* — Craig Kim
(74) *Attorney, Agent, or Firm* — Jenkins, Wilson, Taylor & Hunt, P.A.

(57) ABSTRACT

An anterior part of a nacelle of an aircraft propulsion unit. A rigidifying frame annular about a longitudinal axis of extension of the nacelle is at the rear end of the anterior part. An annular shield is in front of the rigidifying frame and connects an internal peripheral edge of the rigidifying frame to an internal structure. The shield has a portion extending towards the external panel beyond the internal peripheral edge of the rigidifying frame, the portion forming a non-zero angle with respect to the rigidifying frame to form a free space with respect to the rigidifying frame behind the portion. The shield can thus deform in the event of an impact of a foreign object entering through the air inlet lip, without the rigidifying frame itself being deformed, thereby absorbing all or some of the impact energy. A nacelle can have such an anterior part, and an aircraft can have such a nacelle.

12 Claims, 5 Drawing Sheets

(51) Int. Cl.
    *B64D 33/02*    (2006.01)
    *F01D 25/24*    (2006.01)
    *F02C 7/20*     (2006.01)
(52) U.S. Cl.
    CPC .......... *F02C 7/20* (2013.01); *B64D 2033/022* (2013.01); *B64D 2033/0233* (2013.01)

(56) References Cited

U.S. PATENT DOCUMENTS

| | | | | |
|---|---|---|---|---|
| 2010/0260602 | A1* | 10/2010 | Binks | B64D 29/08 |
| | | | | 415/214.1 |
| 2016/0356180 | A1* | 12/2016 | Bol | F01D 21/045 |
| 2017/0122204 | A1* | 5/2017 | Versaevel | F02C 7/045 |
| 2017/0233090 | A1 | 8/2017 | Crawford | |
| 2019/0193833 | A1* | 6/2019 | Vinches | B64D 29/08 |
| 2019/0195085 | A1* | 6/2019 | Vinches | F01D 21/045 |

FOREIGN PATENT DOCUMENTS

| | | |
|---|---|---|
| EP | 3 501 991 A1 | 6/2019 |
| EP | 3 772 458 A1 | 2/2021 |
| FR | 2 966 126 A1 | 4/2012 |
| FR | 3 075 761 A1 | 6/2019 |

OTHER PUBLICATIONS

European Search Report for Application No. 20188811.2 dated Oct. 13, 2020.

* cited by examiner

PRIOR ART

ANTERIOR PART OF A NACELLE OF AN AIRCRAFT PROPULSION SYSTEM HAVING A SHIELD IN FRONT OF ITS RIGIDIFYING FRAME

CROSS-REFERENCE TO RELATED APPLICATION

This application claims the benefit of and priority to French patent application number 19 09033 filed on Aug. 7, 2019, the entire disclosure of which is incorporated by reference herein.

TECHNICAL FIELD

The disclosure herein relates to the field of aircraft propulsion systems and more particularly the nacelles of aircraft propulsion systems.

BACKGROUND

A propulsion system is a device for generating thrust, which constitutes the motive force of the aircraft equipped with the propulsion system. An aircraft propulsion system is shown by way of example in FIG. 1.

The nacelle conventionally has an anterior part P1 forming an air inlet.

The anterior part P1 has the role of collecting air so as to ensure even flow towards the fan.

The nacelle also has a main part P2 constituting the rest of the nacelle.

The propulsion system extends about an axis referred to below as the longitudinal axis A.

A conventional structure of an anterior part of a nacelle of an aircraft propulsion system, as is known from the prior art, is described with reference to FIG. 2.

The anterior part P1 of the nacelle comprises an air inlet lip 1, which can be annular or substantially annular and is disposed at the front end thereof.

Throughout the present document, the concepts of "front" and "rear", of "anterior" and "posterior", and of "upstream" and "downstream" are to be understood as being in the direction of the flow of air through the propulsion system. Thus, the air enters through the front of the propulsion system, that is to say through the anterior part P1 of the nacelle, and reemerges (after some of the air has been used as oxidant) through the rear of the propulsion system, that is to say through the rear end of the main part P2.

In the conventional structure of an anterior part P1 of the propulsion system, a front frame 2 is disposed behind the air inlet lip 1. The front frame defines in particular a de-icing duct for preventing the formation of ice on the leading edge of the air inlet lip, by circulation of hot air in the de-icing duct.

An internal structure 3 having a soundproofing panel extends an interior surface 11 of the air inlet lip 1 towards the rear.

An external panel 4 extends an external surface 12 of the air inlet lip 1 towards the rear.

A rigidifying frame 5, also referred to as rear frame, is furthermore disposed at a rear end of the anterior part P1 of the nacelle and connects the external panel 4 to the internal structure 3.

The rigidifying frame 5 thus defines the boundary between the anterior part P1 and the main part P2 of the nacelle. The rigidifying frame rigidifies the structure, and gives the nacelle significant strength, which is necessary if a fan blade of the propulsion unit breaks. The rigidifying frame 5 can also constitute a firewall and supports the majority of the interfaces of the air inlet with the nacelle and the engine of the propulsion unit.

The longitudinal axis A may be coincident with an axis of revolution of the front frame 2 or of the rigidifying frame 5.

A bracket 7, namely an engine pad bracket, shown in FIG. 2, although not being a part of the anterior part P1 of the nacelle, makes it possible to connect the rigidifying frame 5 to the engine of the propulsion unit, that is to say to the assembly comprising the fan and the turbomachine, and in particular to connect the anterior part P1 of the nacelle to a fan compartment.

Generally, the front frame 2 is disposed in a direction perpendicular to the longitudinal axis of the propulsion system, which is therefore likewise substantially perpendicular to the flow of air entering the nacelle.

The rigidifying frame 5 can also be disposed in a direction perpendicular to the longitudinal axis of the propulsion system, or exhibit a certain inclination, as disclosed in the document FR3075761.

During the various phases of the flight of an aircraft, events that have an impact on the propulsion system may occur.

For example, birds or foreign objects may collide with the aircraft and in particular with one of these propulsion systems. These collisions, and in particular avian collisions, may damage the propulsion systems.

In the prior art, if a bird or an object collides with the nacelle of the propulsion system, the above-described structure is subjected to this collision. The structure is designed, taking this type of event into account, to withstand significant impacts. During an impact, for example that of an avian collision at the air inlet lip 1 of the nacelle N, the bird then strikes the front frame 2, which has to take up and absorb as far as possible the rest of the energy of this impact, which may represent the majority of the impact energy. In certain cases of particularly significant impacts, the front frame may be passed through and/or some of the impact energy may also be transmitted to the rigidifying frame 5. An inclination of the rigidifying frame 5 may make it possible to limit the energy to be absorbed by diverting the impacting object from its initial trajectory, but it limits (with the same dimensions) the effectiveness of the rigidifying frame as regards the rigidification of the structure of the nacelle and the protection as regards blade breakages.

Thus, the front frame 2 and the rigidifying frame 5 are thus designed to absorb a large amount of energy. Such a design has negative consequences on the weight and the cost of manufacturing the frames.

The aim of the disclosure herein is to propose a configuration of the anterior part of the nacelle of an aircraft propulsion unit that makes it possible to remedy at least one of the abovementioned drawbacks, and in particular to improve the integrity with respect to impacts of foreign objects such as a bird, independently of the configuration of the rigidifying frame.

Thus, the disclosure herein relates to an anterior part of a nacelle of an aircraft propulsion system, the anterior part having a front end allowing air to enter and a rear end, the anterior part having:

an air inlet lip disposed at the front end,
an internal structure extending an interior surface of the air inlet lip,
an external panel extending an exterior surface of the air inlet lip, a rigidifying frame that is annular about a longitudinal axis of extension of the nacelle, the rigidifying frame being disposed at the rear end of the anterior part, the rigidifying frame comprising an external peripheral edge connected to the external panel.

This anterior part of the nacelle also has an annular shield, which is positioned in front of the rigidifying frame and connects an internal peripheral edge of the rigidifying frame to the internal structure. The shield has a portion extending towards the external panel beyond the internal peripheral edge of the rigidifying frame, the portion forming a non-zero angle with respect to the rigidifying frame so as to form a free space with respect to the rigidifying frame behind the portion, allowing the shield to deform in the event of an impact of a foreign object entering through the air inlet lip and striking the shield, so as to absorb all or some of the impact energy.

The presence of a shield in front of the rigidifying frame makes it possible to protect the rigidifying frame, and more generally the elements situated behind the shield, in the event of an impact with an object foreign to the nacelle, for example in the event of an avian impact. This makes it possible in particular to modify the distribution of the functions in the nacelle, the rigidifying frame no longer having the function of absorbing the energy of such an impact. As a result, the rigidifying frame has mainly a structural and interface role. Similarly, the front frame, which has become optional, may have only a partitioning role for the deicing duct.

This ultimately allows a lighter design of the rigidifying frame and, if need be, of the front frame, and makes it possible to adopt the desired configuration in terms of position and inclination of the frames, independently of the problem of resistance to impacts of foreign objects.

The anterior part of a nacelle may also have a front frame closing a de-icing duct of the air inlet lip.

The rigidifying frame may be inclined, with respect to a plane orthogonal to the longitudinal axis, at an angle β of between 15°, the rigidifying frame being inclined in the direction of the front of the anterior part of the nacelle, and 80°, the rigidifying frame being inclined towards the rear of the anterior part of the nacelle.

The shield may have a portion extending towards the external panel beyond the internal peripheral edge of the rigidifying frame, the portion forming a non-zero angle with respect to the rigidifying frame so as to form the space with respect to the rigidifying frame.

The shield may have a concave shape oriented towards the front of the anterior part of the nacelle.

The shield may have a substantially I-shaped, L-shaped, or C-shaped section.

The shield may have a closed section forming the free space in the shield, for example a substantially O-shaped, D-shaped, or g-shaped section.

The shield may be metallic and have, in section, branches with a thickness of between 1 mm and 3 mm.

A deformable element may be interposed between the shield and the rigidifying frame.

A bracket of a main part of the nacelle may also be connected to the shield, and a deformable element may be interposed between the shield and the bracket.

A deformable exterior element may be interposed between the rigidifying frame and the external panel.

The disclosure herein also relates to a nacelle of an aircraft propulsion unit, having an anterior part as described above. The disclosure herein relates finally to an aircraft having a propulsion unit having such a nacelle.

Further particular features and advantages of the disclosure herein will become more apparent from the following description.

BRIEF DESCRIPTION OF THE DRAWINGS

In the appended drawings, which are given by way of non-limiting examples.

DETAILED DESCRIPTION

Figure 1:
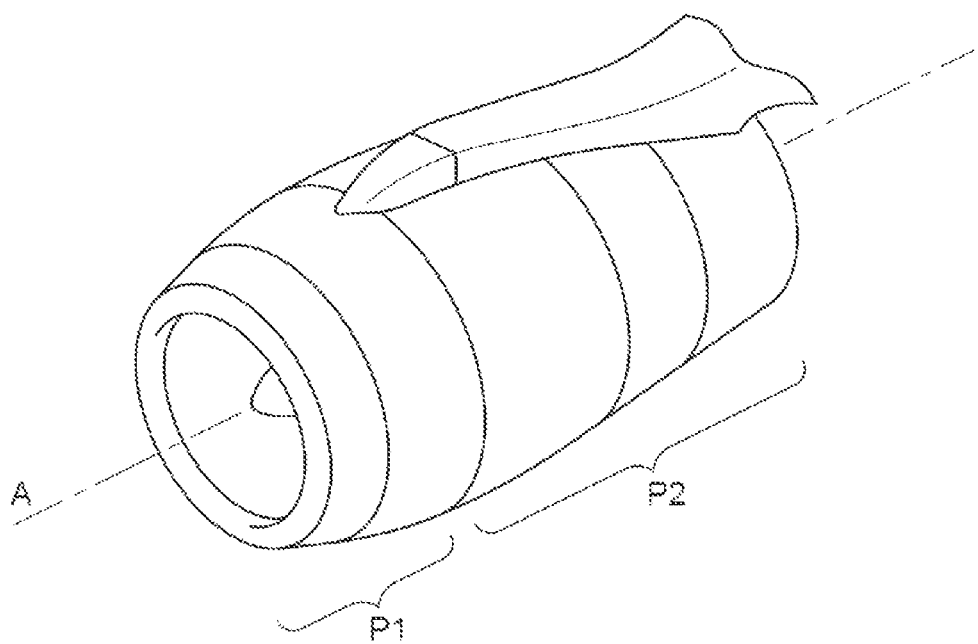
FIG. 1 shows a three-dimensional schematic view of an aircraft propulsion system.
Figure 2:
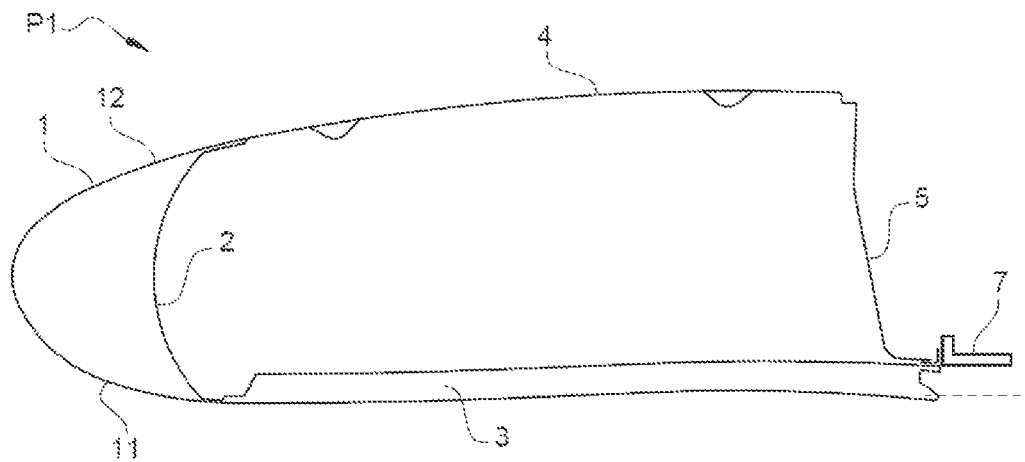
FIG. 2 shows a schematic partial view in cross section of an anterior part of a nacelle of an aircraft propulsion system according to the prior art.

FIGS. 1 and 2, which respectively present general features of aircraft propulsion systems and a configuration of an anterior part of a nacelle according to the prior art, were described above in the preamble of the present document.

Figure 3:
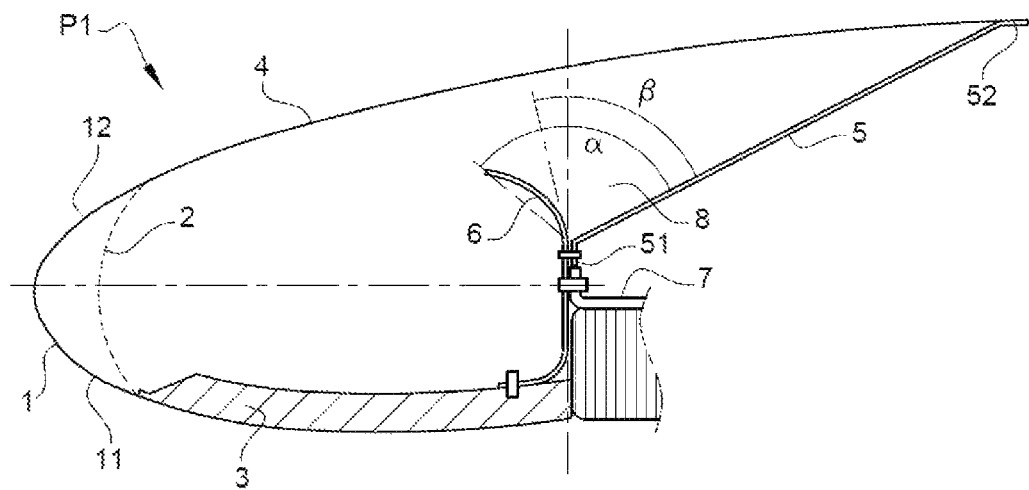
FIG. 3 shows a view analogous to the one in FIG. 2 of an anterior part of a nacelle of an aircraft propulsion system according to a first embodiment of the disclosure herein.

FIG. 3 shows a view analogous to the one in FIG. 2 of an anterior part of a nacelle according to a first embodiment of the disclosure herein. More specifically, FIG. 3 shows only a partial section of this annular structure.

The configuration presented is applicable in particular to an anterior part of a nacelle for a UHBR engine. A UHBR engine has a high bypass ratio (the mass ratio between the secondary flow and the primary flow). Such an engine has a nacelle of large size, in particular with a larger diameter than the diameters of the propulsion systems employed hitherto on commercial aircraft.

The anterior part P1 of a nacelle of an aircraft propulsion system that is shown in FIG. 3 has an air inlet lip 1, which defines the leading edge of the anterior part P1 of the nacelle, and therefore the leading edge of the aerodynamic fairing formed by the nacelle once the latter has been put together with the anterior part P1.

The air inlet lip 1 forms the front end of the anterior part P1 of the nacelle. It has a closed, substantially annular, shape, but is not necessarily perfectly circular (axisymmetric).

According to the embodiment described, the air inlet lip 1 has an interior surface 11 and an exterior surface 12.

The interior surface 11 of the air inlet lip 1 is extended by an internal structure 3. The internal structure 3 has in particular a panel that forms the internal aerodynamic surface of the anterior part P1 of the nacelle, channelling the flow of air entering the nacelle. The internal structure 3 may have a significant acoustic role, to limit the noise emitted by the propulsion system. The internal structure 3 may in particular have a soundproofing panel, known from the prior art, having a configuration that makes it possible to avoid the transmission of sound waves or to promote the absorption thereof.

The exterior surface 12 of the air inlet lip 1 is extended by an external panel 4. Although these are generally separate parts, in certain embodiments the air inlet lip 1 and the exterior panel 4 can be formed in a one-piece manner. Similarly, the air inlet lip 1 and the internal structure 3 can be in one piece. The external panel 4 forms the exterior aerodynamic surface of the anterior part P1 of the nacelle. When the nacelle has been put together, the external panel 4 is itself extended at the main part P2 so as to form the external aerodynamic surface of the nacelle, which is configured in particular to limit the aerodynamic drag.

The front frame 2 is shown by way of a dashed line in FIG. 3, since the front frame is optional in the disclosure herein. Specifically, the front frame no longer necessarily needs to fulfil the function of absorbing the energy of an impact with an object foreign to the nacelle, as is the case in the prior art. In particular, in certain embodiments of the disclosure herein, the front frame 2 can have a simple function of partitioning the de-icing duct (also known as the "D-duct" in reference to the D-shaped section of this duct). Although only shown in FIG. 3, a front frame can be provided in all the embodiments of the disclosure herein, and in particular in the embodiments described below with reference to FIGS. 6 through 8. The elimination of the front frame 2 can limit the drag generated by the nacelle, since the connections made between the front frame 2 and the walls of the nacelle are a source of local geometric irregularities that can create additional drag. Moreover, since the front frame is not functionally necessary when the air inlet lip is equipped with an electric de-icing system, the elimination thereof makes it possible to save weight.

The anterior part P1 has a rigidifying frame 5 disposed at the rear end of the anterior part P1.

The rigidifying frame constitutes an important structural element of the anterior part of the nacelle.

In a known way, the rigidifying frame 5 has numerous functions associated with the mechanical strength of the anterior part of the nacelle. The rear frame 5 can be metallic, made of a composite material, or made of a hybrid composite/metallic material.

In particular, the rigidifying frame 5 is intended to be connected, directly or via other elements, to the engine of the propulsion system. An engine is understood to be, in a general manner, the propulsion mechanism contained in the nacelle once the latter has been put together. The engine comprises generally a turbomachine and a fan driven by the turbomachine. The rigidifying frame 5 can in particular be connected to a fan compartment, that is to say to a casing of the fan.

The rigidifying frame 5 acts as a connector between the walls of the anterior part of the nacelle, that is to say a connector between the external panel 4 and the internal structure 3.

The rigidifying frame 5, which has an annular shape about the longitudinal axis of extension of the nacelle, comprises in particular an external peripheral edge 52 connected to the external panel 4. The rigidifying frame 5 also comprises an internal peripheral edge 51, which is indirectly connected to the internal structure 3 in the disclosure herein, as described below.

The structure of the anterior part P1 in FIG. 3, corresponding to one exemplary embodiment of the disclosure herein, differs in particular from the structure known from the prior art and described with reference to FIG. 2 in that it has a shield 6. The shield 6 is an element formed in one or more parts (for example a plurality of joined-together sectors) which is connected to the rigidifying frame 5 in front of the latter. The shield 6 has a first function of connecting together the internal peripheral edge 51 of the rigidifying frame and the internal structure 3.

In a portion of the shield 6, a free space 8 is provided behind the shield so as to allow it to deform without the rigidifying frame 5 being itself directly or almost directly impacted and deformed.

Various arrangements of the rigidifying frame 5 and of the shield 6 make it possible to obtain such a configuration and in particular the formation of a free space 8 behind a portion of the shield 6.

Thus, the rigidifying frame 5 can be "straight", that is to say substantially orthogonal to the longitudinal axis A, or be inclined, slightly towards the front of the nacelle, or slightly or greatly towards the rear of the nacelle. An inclination towards the front corresponds to an inclination in which an exterior edge of the shield is further forward than its interior edge, that is to say its edge that is connected to the internal structure 3. An inclination towards the rear corresponds to an inclination in which an exterior edge of the shield is further towards the rear than its interior edge, that is to say its edge that is connected to the internal structure 3. In particular, the rigidifying frame 5 may be inclined, with respect to a plane orthogonal to the longitudinal axis (A), at an angle β of between 15°, the rigidifying frame being inclined in the direction of the front of the anterior part of the nacelle, and 80°, the rigidifying frame being inclined towards the rear of the anterior part of the nacelle.

Such an inclination of the rigidifying frame 5 allows the formation of a shield 6 having a portion extending in the direction of the external panel 4, forming a (non-zero) angle α with respect to the rigidifying frame 5. The shield 6 thus extends away from the rigidifying frame 5, thereby forming the free space 8. This configuration applies both a shield, the section of which is formed of straight segments, and to a shield of curved, rounded, section, as shown in FIG. 3, the angle α being considered for the direction formed by the shield between the point at which the shield 6 detaches from the rigidifying frame 5 and the end of the shield 6.

In the example embodiment in FIG. 3, the shield has a concave shape oriented towards the front of the anterior part of the nacelle.

The connection of the anterior part P1 of the nacelle to the engine is ensured via a bracket 7. The bracket 7 shown in FIG. 3 may correspond, in various possible configurations, to the engine pad bracket or to an intermediate bracket interposed between the shield 6 and the engine pad bracket, which is fixed to the engine of the propulsion system.

Figure 4:
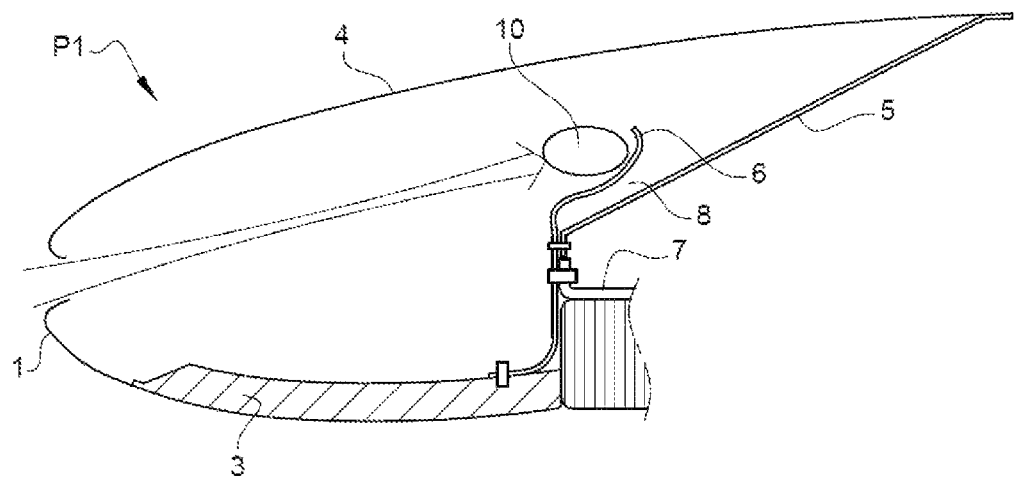
FIG. 4 shows a view analogous to the one in FIGS. 2 and 3 of the anterior part of a nacelle from FIG. 3 following an impact with a foreign object.

When the nacelle with which an aircraft is equipped encounters a foreign object 10, the foreign object 10 can pass through the air inlet lip and penetrate into the anterior part P1 of the nacelle, as is shown schematically in FIG. 4 by an arrow illustrating the trajectory of the foreign object 10.

When the foreign object 10 strikes the shield 6, the latter can deform into the free space 8. The deformation of the shield 6 absorbs the energy of the impact with the foreign object 10. The integrity of the rigidifying frame 5 is preserved. More generally, the rigidifying frame 5 is not employed in the absorption of the energy of the impact with a foreign object 10, or is employed to absorb a limited amount of energy, some of the energy of the impact having been absorbed by the shield 6.

Figure 5:
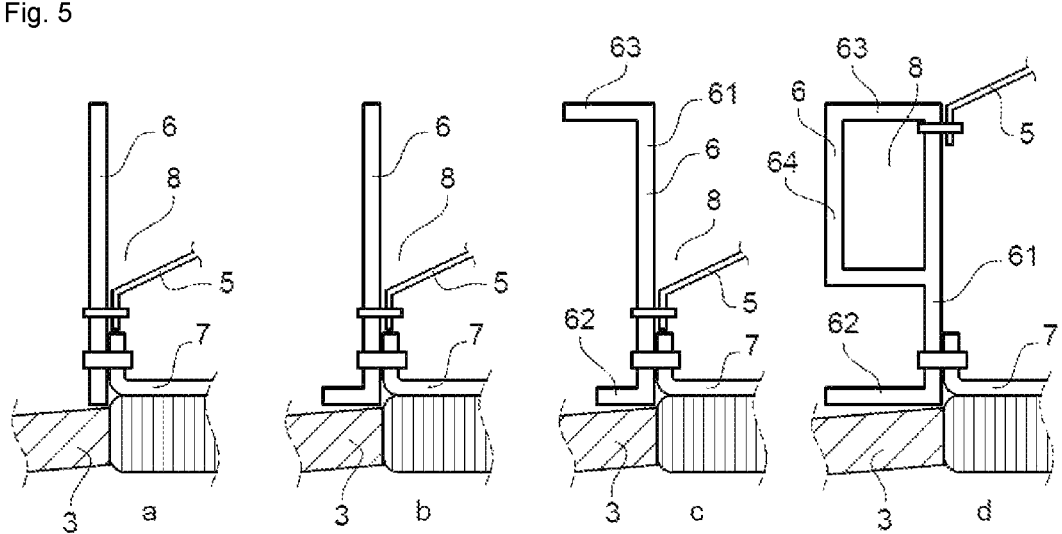
FIG. 5 shows a schematic view in cross section of the respective sections of four variants of shields that can be employed in embodiments of the disclosure herein.

FIG. 5 shows a schematic view in cross section of the respective sections of four variants of shields that can be employed in embodiments of the disclosure herein. In particular, the four alternative variants shown in FIG. 5 are respectively referenced a, b, c and d.

The variant shown in FIG. 5 under the reference (a) has a straight shield 6, that is to say one having an I-shaped section and extending in a plane orthogonal to the longitudinal axis A. The rigidifying frame 5 is inclined towards the rear of the nacelle (that is to say that its internal peripheral edge 51 is further forward than its external peripheral edge 52, so as to form the free space 8 allowing the deformation of the shield 6 in the event of an impact).

The variant shown in FIG. 5 under the reference (b) differs from the variant under reference (a) by having a shield 6 with an L-shaped section, that is to say having two mutually orthogonal branches. Thus, the shield 6 can exhibit better stability with respect to the internal structure 3, to which it can be connected.

The variant shown in FIG. 5 under the reference (c) differs from the variant under reference (b) by having a shield 6 with a C-shaped section, formed of three branches, namely a main branch 61 and two branches 61, 62 orthogonal to the main branch. The concavity of the shield 6 is oriented towards the front of the anterior part of the nacelle. More specifically, an exterior orthogonal branch 63 makes it possible, in the event of an impact of a foreign object with the shield, to increase the effectiveness of the shield in absorbing the energy of the impact by deformation.

Of course, a variant that is not shown having a main branch 61 and an exterior orthogonal branch 63, but no interior orthogonal branch 62 bearing on the internal structure 3, is conceivable.

The variant shown in FIG. 5 under the reference (d) illustrates two aspects, namely the formation of the free space 8 by the adaptation of a hollow section of shield 6, and the fixing of the rigidifying frame 5 at the exterior part of the shield 6. As regards the formation of the free space 8, the shield has, in the example shown here, a g-shaped section, having a main branch 61, an interior orthogonal branch 61, an exterior orthogonal branch 63, and a front branch 64, behind which the free space 8 is thus formed. During an impact with a foreign object, it is this front branch 64 that is impacted, and it is thus this exterior branch 64 that constitutes a portion of the shield behind which the free space is formed. The deformation of the shield 6 thus takes place by deformation of the front branch 64 and/or by the latter moving towards the main branch 61.

According to this principle, numerous other shield sections are conceivable, namely any hollow, closed section, and certain open sections (for example y-shaped) having a branch of the shield in front of its main branch.

Thus, a free space is formed by the shield between the front branch 64 (which may be straight or curved) and the rigidifying frame 5, which, for its part, is connected to the rear of the main branch 61.

The use of such a shield also makes it possible to position the connection between the shield 6 and the rigidifying frame 5 at the desired radial position. Specifically, since the shield itself forms the free space necessary for its deformation, it is not necessary to connect the rigidifying frame to the shield as close as possible to the longitudinal axis A in order to create a free space between the shield 6 and the rigidifying frame 5, forming an angle therebetween.

In all of the embodiments of the shield 6, the latter can be metallic, for example made of aluminium, an aluminium alloy or titanium. The thickness of the shield can be for example around 1 mm to 2 mm, for example about 1.5 mm.

In a general manner, the shield 6 can be connected to the internal structure 3, to the bracket 7 and to the rigidifying frame by separate connections that make it easier to remove the anterior part of the nacelle as required. By contrast, the connection between the shield 6, the rigidifying frame 5 and the bracket 7 can be a common connection.

Figure 6:
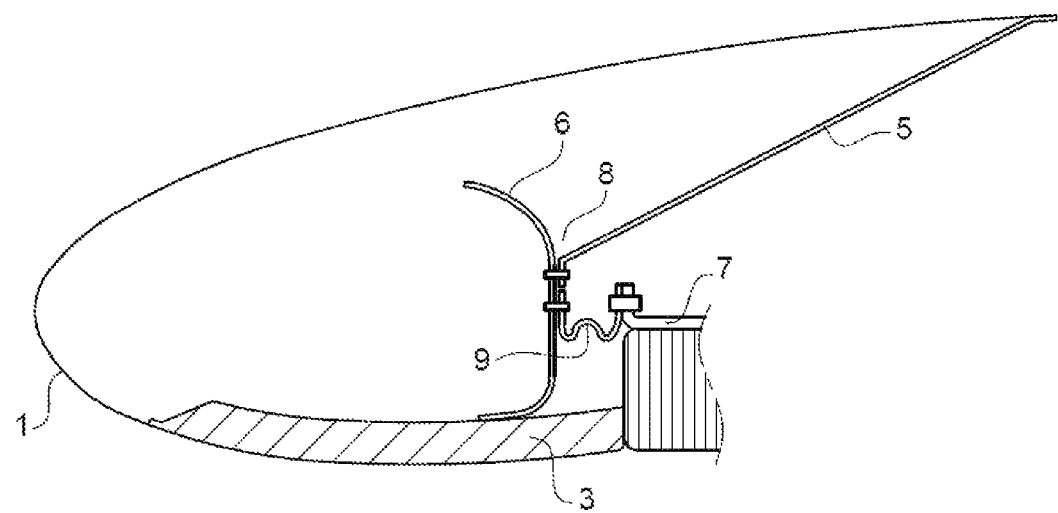
FIG. 6 shows a view analogous to the one in FIGS. 2 through 4 of an anterior part of a nacelle of an aircraft propulsion system according to a second embodiment of the disclosure herein.

FIG. 6 shows an embodiment of the disclosure herein in which a deformable element 9, referred to as "damper", is positioned between the shield 6 and the bracket 7 (engine pad bracket or intermediate bracket to which the engine pad bracket is connected).

The deformable element 9 is an annular part, or a discrete set of parts distributed in an annular manner between the shield and the bracket 7, which is able to deform in particular in the longitudinal direction in the event of a violent impact on the shield in order to protect the bracket 7 from the effects of the impact. This makes it possible to reliably limit the consequences of the impact just to the anterior part P1 of the nacelle.

The deformable element can adopt multiple forms. In the example shown here, the deformable element 9 has a wavy, substantially W-shaped, section, which is configured to be deformed under the effect of an impact having a strong longitudinal component.

Alternatively, the deformable element (or each discrete part of the deformable element) can have a hollow closed section, for example circular, elliptical or oval, which, if need be, is flattened at the interfaces with the shield 6 and the bracket 7.

The deformable element 9 allows the energy of the impact to be absorbed by plastic deformation. The deformable element 9 may have an elastic element, for example an elastomer element that gives it actual damping properties.

Figure 7:
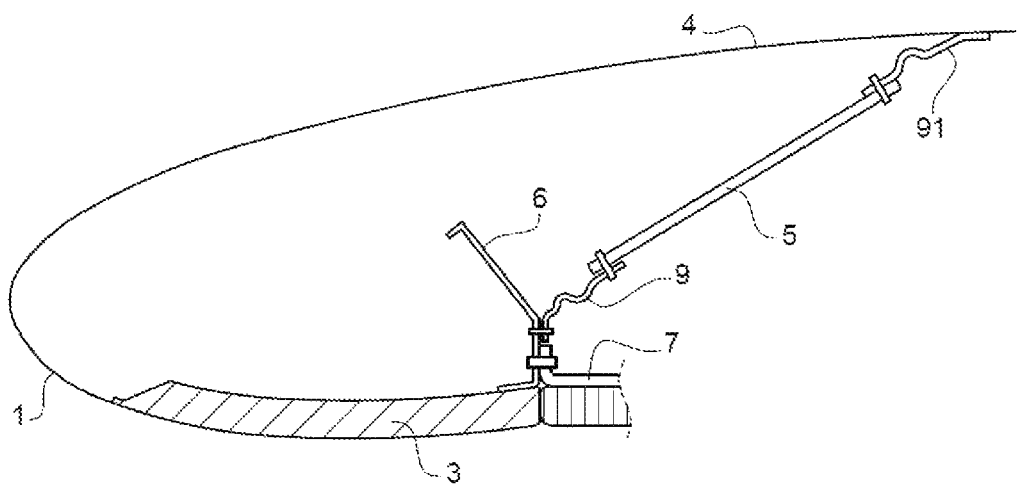
FIG. 7 shows a view analogous to the one in FIG. 6 of an anterior part of a nacelle of an aircraft propulsion system according to a third embodiment of the disclosure herein.

FIG. 7 presents an embodiment of the disclosure herein in which a deformable element 9 is interposed between the shield 6 and the rigidifying frame 5. The description given above in relation to a deformable element interposed between the shield 6 and the bracket 7 is applicable to this deformable element interposed between the shield 6 and the rigidifying frame 5. It can thus be annular or discrete, and have various sections allowing it to deform longitudinally and/or in the plane of extension of the rigidifying frame 5. Similarly, it may comprise an elastic element that gives it damping properties.

The embodiment in FIG. 7 also has a deformable exterior element 91 interposed between the rigidifying frame 5 and the external panel 4. The description given above in relation to a deformable element 9 interposed between the shield 6 and the bracket 7 or between the shield and the rigidifying frame 5 is applicable to this deformable exterior element 91.

It can thus be annular or discrete, and have various sections allowing it to deform longitudinally and/or in the plane of extension of the rigidifying frame 5. Similarly, it may comprise an elastic element that gives it damping properties. Although it is shown with the embodiment in FIG. 7, the deformable exterior element 91 can be optionally used in all of the embodiments of the disclosure herein. Similarly, an embodiment of the disclosure herein having a deformable element 9 interposed between the shield 6 and the rigidifying frame 5 may have no deformable exterior element 91 (the connection between the rigidifying frame 5 and the exterior panel 4 being realized for example as shown for the embodiment in FIG. 6).

Figure 8:
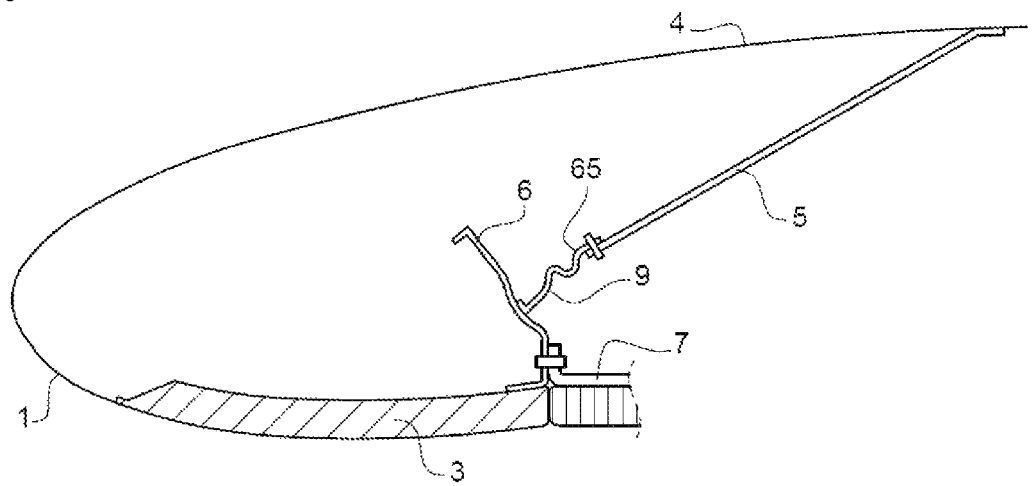
FIG. 8 shows a view analogous to the one in FIG. 7 of a variant of the third embodiment of the disclosure herein shown in FIG. 7.

FIG. 8 shows an embodiment in which the deformable element 9 is formed integrally with the shield 6. Thus, in this embodiment, the shield 6 has, as seen in section, a deformable branch 65.

Regardless of whether the deformable element is formed as a separate part or is formed in one piece with the shield 6, the connection between the deformable element 9 and the rigidifying frame 5 can be realized by the internal face or the external face of the rigidifying frame.

In the case of an element 9 interposed between the shield and the frame, regardless of whether it is formed as a separate part or in one piece with the shield, the portion of the shield extending towards the external part extends beyond the internal peripheral edge of the deformable element 9, this peripheral edge being considered to be the internal peripheral edge of the frame (since the element 9 extends the frame as far as the shield) given that the external part extends beyond the internal peripheral edge of the frame.

Moreover, the embodiments in FIGS. 7 and 8 and the one illustrated in FIG. 6 can be combined such that a first deformable element 9 is interposed between the shield 6 and the bracket 7, and a second deformable element 9 is interposed between the shield 6 and the rigidifying frame 5. This makes it possible to combine the necessary protection of the bracket 7 and thus of the main part P2 of the nacelle, and increased protection of the rigidifying frame 5.

Figure 9:
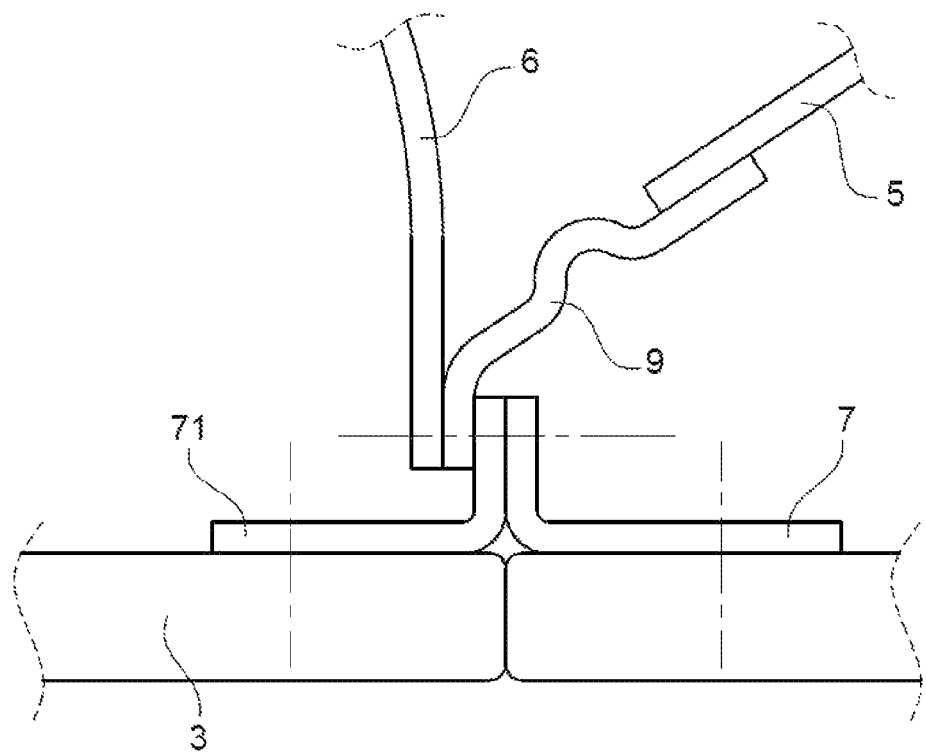
FIG. 9 shows a detail view in cross section of an example of a connection between a shield, a rigidifying frame and a bracket that can be employed in the disclosure herein.

Finally, FIG. 9 illustrates the fact that the connection between the shield 6, the rigidifying frame and the bracket 7 can be realized in various variants of the embodiments set out above. For example, in the embodiment in FIG. 9, the shield 6 and the rigidifying frame 5 are connected to a front bracket 71, which is itself connected to the internal structure 3 and to the bracket 7. In the present case, the rigidifying frame 5 is connected to the front bracket 71 by a deformable element 9, which is optional.

Figure 10:
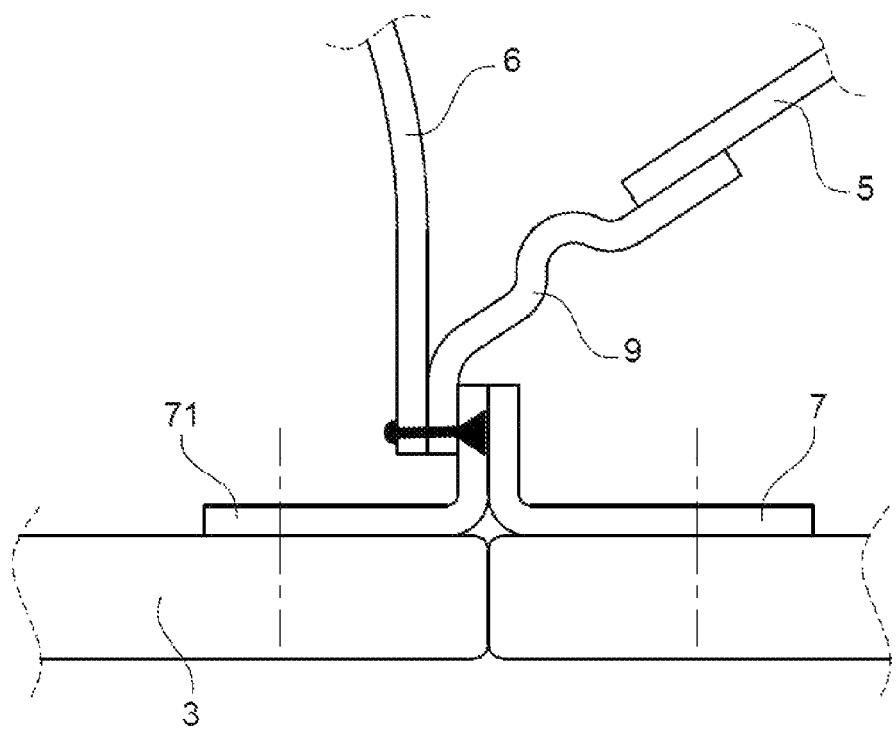
FIG. 10 shows, in cross section, one aspect of an example of a connection between a shield, a rigidifying frame and a bracket that can be employed in the disclosure herein.

The connection between the shield 6, the rigidifying frame 5 (via the deformable element 9, if necessary) and the bracket 7 can be a common connection that passes through all of these elements. Alternatively, the shield 6 and the rigidifying frame 5 may be connected only to the front bracket 71 (as illustrated in FIG. 10), the latter being connected to the bracket 7 by a separate connection. For example, connections between the shield 6, the rigidifying frame 5 and the front bracket 71 only can be realized along the periphery of the front bracket 71 in alternation with connections to the bracket 7, for example common connections like the one illustrated in FIG. 9.

The disclosure herein thus developed thus makes it possible first and foremost to protect the rigidifying frame in the event of an impact of the nacelle with a foreign object. Since the rigidifying frame is protected, it no longer has to ensure the function of protecting against foreign object impacts, in particular avian impacts, (or ensures this to a lesser extent) and its makeup and its configuration can be revised with a degree of freedom. A rigidifying frame that is lighter than in the known prior art can be used. The front frame can be made lighter, or eliminated.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An anterior part of a nacelle of an aircraft propulsion system, the anterior part having a front end allowing air to enter and a rear end, the anterior part comprising:
   an air inlet lip disposed at the front end;
   an internal structure extending an interior surface of the air inlet lip;
   an external panel extending an exterior surface of the air inlet lip;
   a rigidifying frame that is annular about a longitudinal axis of extension of the nacelle, the rigidifying frame being disposed at the rear end of the anterior part, the rigidifying frame comprising an external peripheral edge connected to the external panel;
   the anterior part of the nacelle also comprising an annular shield which is positioned in front of the rigidifying frame and connects an internal peripheral edge of the rigidifying frame to the internal structure;
   the shield having a portion extending towards but remaining spaced apart from the external panel beyond the internal peripheral edge of the rigidifying frame, the portion forming a non-zero angle with respect to the rigidifying frame to form a free space with respect to the rigidifying frame behind the portion, allowing the shield to deform in an event of an impact of a foreign object entering through the air inlet lip and striking the shield, to absorb all or some of the impact energy.

2. The anterior part of a nacelle according to claim 1, further comprising a front frame closing a de-icing duct of the air inlet lip.

3. The anterior part of a nacelle according to claim 1 wherein the rigidifying frame is inclined, with respect to a plane orthogonal to the longitudinal axis, at an angle β of between 15°, the rigidifying frame being inclined in a direction of a front of the anterior part of the nacelle, and 80°, the rigidifying frame being inclined towards a rear of the anterior part of the nacelle.

4. The anterior part of a nacelle according to claim 1, wherein the shield has a concave shape oriented towards a front of the anterior part of the nacelle.

5. The anterior part of a nacelle according to claim 1, wherein the shield has a substantially I-shaped, L-shaped, or C-shaped section.

6. The anterior part of a nacelle according to claim 1, wherein the shield has a closed section forming the free space in the shield, or where the shield has a closed section forming the free space in the shield that comprises a substantially O-shaped, D-shaped, or g-shaped section.

7. The anterior part of a nacelle according to claim 1, wherein the shield is metallic and has, in section, branches with a thickness of between 1 mm and 3 mm.

8. The anterior part of a nacelle according to claim 1, wherein a deformable element is interposed between the shield and the rigidifying frame.

9. The anterior part of a nacelle according to claim 1, wherein a bracket of a main part of the nacelle is also connected to the shield, and wherein a deformable element is interposed between the shield and the bracket.

10. The anterior part of a nacelle according to claim 1, wherein a deformable exterior element is interposed between the rigidifying frame and the external panel.

11. A nacelle of an aircraft propulsion unit, having an anterior part according to claim 1.

12. An aircraft having a propulsion unit having a nacelle according to claim 1.

\* \* \* \* \*